United States Patent [19]

Yakou et al.

[11] Patent Number: 5,127,692

[45] Date of Patent: Jul. 7, 1992

[54] ARTICLE GRIPPING APPARATUS

[75] Inventors: Takeshi Yakou, Tokyo; Yasushi Aoki; Toshio Tsuda, both of Yokohama, all of Japan

[73] Assignee: Canon Kabushiki Kaisha, Tokyo, Japan

[21] Appl. No.: 584,482

[22] Filed: Sep. 17, 1990

Related U.S. Application Data

[63] Continuation of Ser. No. 259,786, Oct. 19, 1988, abandoned.

[30] Foreign Application Priority Data

| Oct. 20, 1987 | [JP] | Japan | 62-159407[U] |
| Oct. 20, 1987 | [JP] | Japan | 62-159408[U] |
| Oct. 20, 1987 | [JP] | Japan | 62-159409[U] |
| Oct. 20, 1987 | [JP] | Japan | 62-262917 |

[51] Int. Cl.$^5$ ............... B66C 1/02; B25B 15/06; B25B 15/10
[52] U.S. Cl. .................. 294/2; 294/64.1; 901/40
[58] Field of Search ............ 294/2, 64.1, 65; 901/40, 30, 31; 414/737; 29/743

[56] References Cited

U.S. PATENT DOCUMENTS

| 3,651,957 | 3/1972 | Ball et al. | 294/2 X |
| 4,527,327 | 7/1985 | Van Deuren | 29/743 X |
| 4,611,397 | 9/1986 | Janisiewicz et al. | 294/2 X |
| 4,707,012 | 11/1987 | Takagi | 294/64.1 |
| 4,852,247 | 8/1989 | Hawkswell | 294/2 X |

FOREIGN PATENT DOCUMENTS

| 154552 | 11/1985 | European Pat. Off. | 294/2 |
| 54-6949 | 4/1979 | Japan . | |
| 55-150989 | 11/1980 | Japan . | |
| 56-6315 | 2/1981 | Japan . | |
| 58-50835 | 11/1983 | Japan . | |
| 61-35089 | 8/1986 | Japan . | |
| 61-256004 | 11/1986 | Japan . | |
| 62-18317 | 4/1987 | Japan . | |
| 63-14500 | 1/1988 | Japan . | |
| 637313 | 12/1978 | U.S.S.R. | 294/64.1 |

OTHER PUBLICATIONS

IBM Technical Disclosure Bulletin vol. 19, No. 3, Aug. 1976.
Western Electric Technical Digest No. 22, Apr. 1971.

Primary Examiner—Johnny D. Cherry
Assistant Examiner—Dean J. Kramer
Attorney, Agent, or Firm—Fitzpatrick, Cella, Harper & Scinto

[57] ABSTRACT

An article gripping apparatus selectively grips a first article having a functional surface and a non-functional surface, and an elastically deformable second article. A first contact mechanism contacting the first article includes a plurality of contact members contacting the non-functional surface of the first article, and a suction member which chucks the first article at a position where the suction member does not contact the functional surface of the first article in a state wherein the contact members are in contact with the first article.

11 Claims, 9 Drawing Sheets

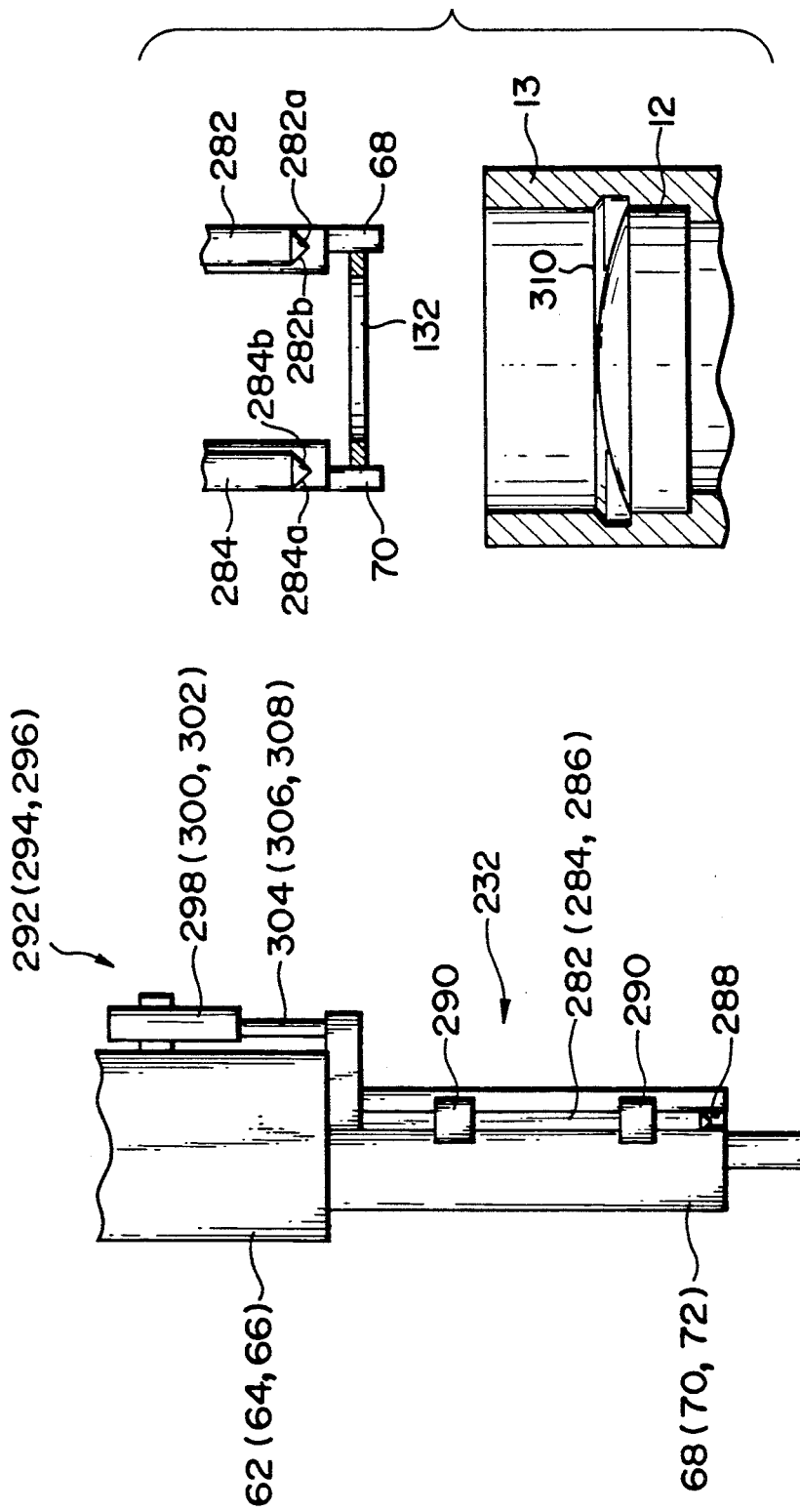

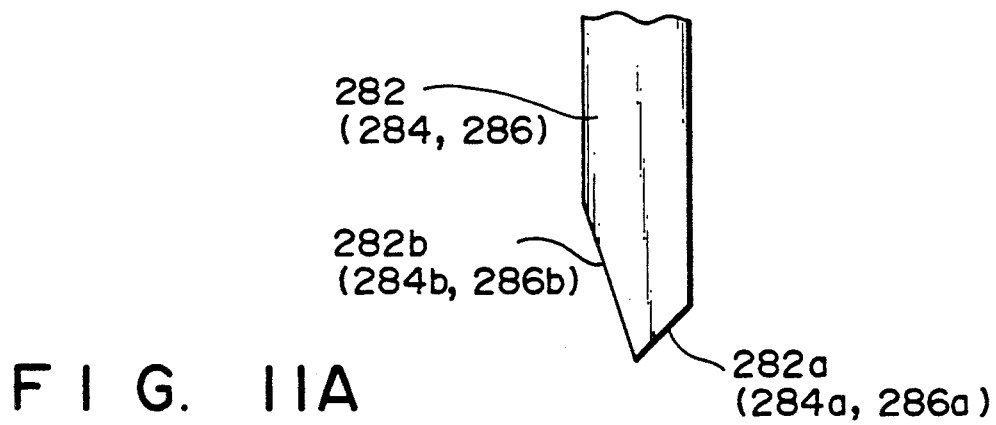
F I G. 11A
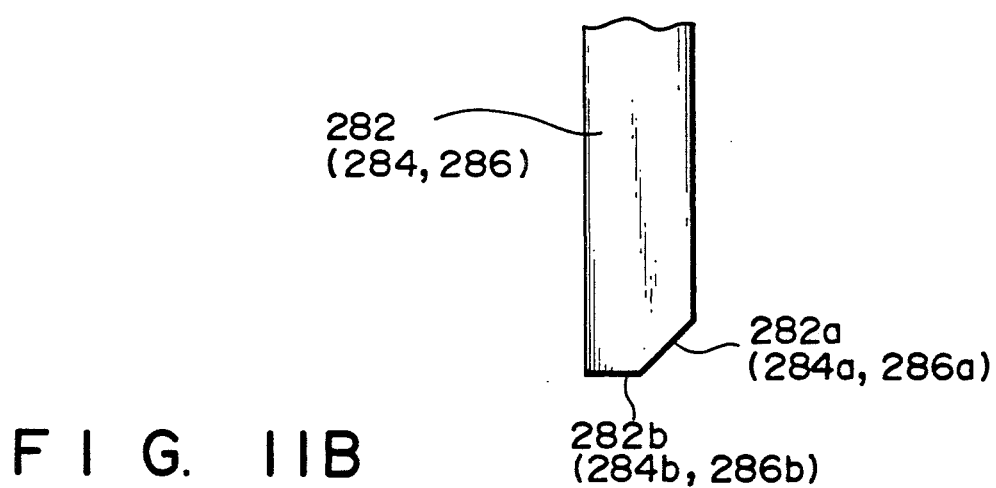
F I G. 11B
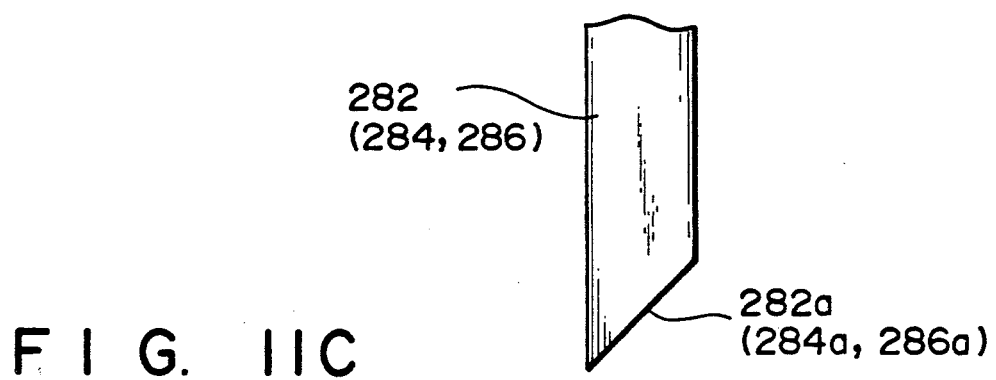
F I G. 11C

ARTICLE GRIPPING APPARATUS

This application is a continuation of application Ser. No. 259,786 filed Oct. 19, 1988, now abandoned.

BACKGROUND OF THE INVENTION

The present invention relates to an article gripping apparatus used for gripping and conveying an article with fingers of a robot or an automatic assembly system and, more particularly, to an article gripping apparatus suitable for gripping an optical lens used in optical equipment.

Conventionally, various types of article gripping apparatus for gripping and conveying an article as described below are known.

(i) An article gripping apparatus, utilizing a so-called chucking operation, grips an article by drawing and holding the article by a suction force such as vacuum suction, and conveys the gripped article from a predetermined position to another position or assembles it in another article. An article gripping apparatus of this type is disclosed in Japanese Utility Model Publication No. 54-6949, Japanese Patent Laid-Open (Kokai) No. 55-150989, Japanese Patent Publication Nos. 61-35089 and 62-18317, and the like. These specifications disclose article gripping apparatuses which directly chuck and hold the article.

(ii) Another known article gripping apparatus employs a method of gripping an article using a plurality of gripping members or finger members. For example, Japanese Utility Model Publication No. 56-6315 discloses an apparatus wherein three pawls are coupled to a motor through coupling means constituted by a threaded shaft and a bevel gear, and are opened/closed by the motor to grip an article Japanese Patent Publication No. 58-50835 discloses an apparatus wherein three finger members are driven by a motor through gears.

(iii) Various functions of a gripping apparatus of the present invention include a function of centering an article to be gripped. An article gripping apparatus comprising a centering function is disclosed in, e.g., Japanese Patent Laid-Open (Kokai) No. 61-256004.

(iv) Furthermore, Japanese Patent Laid-Open (Kokai) No. 63-14500 discloses a conventional mounting head comprising a suction nozzle and a position regulating pawl for regulating the position of an article.

As described above, the present invention particularly relates to an article gripping apparatus suitable for gripping an optical lens used in optical equipment. A lens surface of such an optical lens is required to have high surface finishing precision and cleanliness in order to transmit and refract a light beam. As a result, when the optical lens is assembled in a lens barrel or optical equipment, an optical functional surface of the lens must be free from damage or contamination due to direct contact with the optical functional surface upon gripping of the optical lens.

For this reason, when the optical lens is assembled in the lens barrel, it is impossible to grip an outer peripheral portion of the optical lens from the outside using finger members so as to fit it into the lens barrel. More specifically, the inner peripheral surface of the lens barrel and the outer peripheral surface of the optical lens have substantially the same diameters. Therefore, there is no allowance for gripping the outer peripheral portion of the optical lens from the outside by the finger members. As a result, it is impossible to fit the optical lens into a predetermined position of the lens barrel while gripping the optical lens.

After the optical lens is fitted in a lens locking portion inside the lens barrel, a metal elastic ring or C-ring for fixing the optical lens in position must be inserted in the lens barrel. Thus, in the gripping apparatus used for inserting these rings into the lens barrel, the ring is gripped by a plurality of finger members from a radially outer position, and is pressed radially inwardly so as to decrease an interval between these finger members, and reduce the outer diameter of the ring in a natural state. In this state, the ring is inserted in the lens barrel in which the optical lens was fitted. In this gripping apparatus, since a pressing force is applied to the ring by the finger members, it is difficult to remove the ring from the gripping apparatus. In this manner, if the ring cannot be smoothly removed from the gripping apparatus, lens fixing by the ring cannot be reliably performed, thus posing a problem.

SUMMARY OF THE INVENTION

The present invention has been made in consideration of the above situation, and has as its main object to provide an article gripping apparatus which can satisfactorily grip an article, a surface of which serves as an optical functional surface and cannot be brought into direct contact with a suction member.

It is another object of the present invention to provide an article gripping apparatus which chucks and holds an optical functional surface of an article without being in direct contact therewith, thus preventing the functional surface of the article from damage, and can fit the article inside a barrel while the article is gripped by gripping members.

It is still another object of the present invention to provide an article gripping apparatus comprising a function of centering an article to be gripped to a gripping position by gripping members prior to a gripping operation of the article.

It is still another object of the present invention to provide an article gripping apparatus which can smoothly release an article from gripping members after the article such as a C-ring is gripped and conveyed to a predetermined position.

It is still another object of the present invention to provide an article gripping apparatus which can release and fit a ring to a predetermined position of a lens barrel against an elastic force of the ring in order to fix an optical lens at a predetermined position of the lens barrel.

To attain the above-mentioned main object, according to one aspect of the present invention, there is provided an article gripping apparatus for selectively gripping a first article having a functional surface and a non-functional surface, and an elastically deformable second article. The apparatus includes contact means for contacting the first article, with the contact means comprising a plurality of contact members contacting the non-functional surface of the first article and suction means for chucking the first article. The suction means chucks the first article at a position where the suction means does not contact the functional surface of the first article in a state wherein the contact members are in contact with the first article.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a side view showing a state wherein a pressing member is mounted on a gripping segment;

FIG. 9 is a front view showing a state wherein the gripping segments grip a C-ring;

FIGS. 11A to 11C are sectional views respectively showing first to third modifications of the third embodiment.

DETAILED DESCRIPTION OF THE PREFERRED EMBODIMENTS

An arrangement of a first embodiment of an article gripping apparatus according to the present invention will be described hereinafter with reference to FIGS. 1 to 4. In this case, the present invention is applied to a robot hand selectively attached to an arm of the robot.

Figure 1:
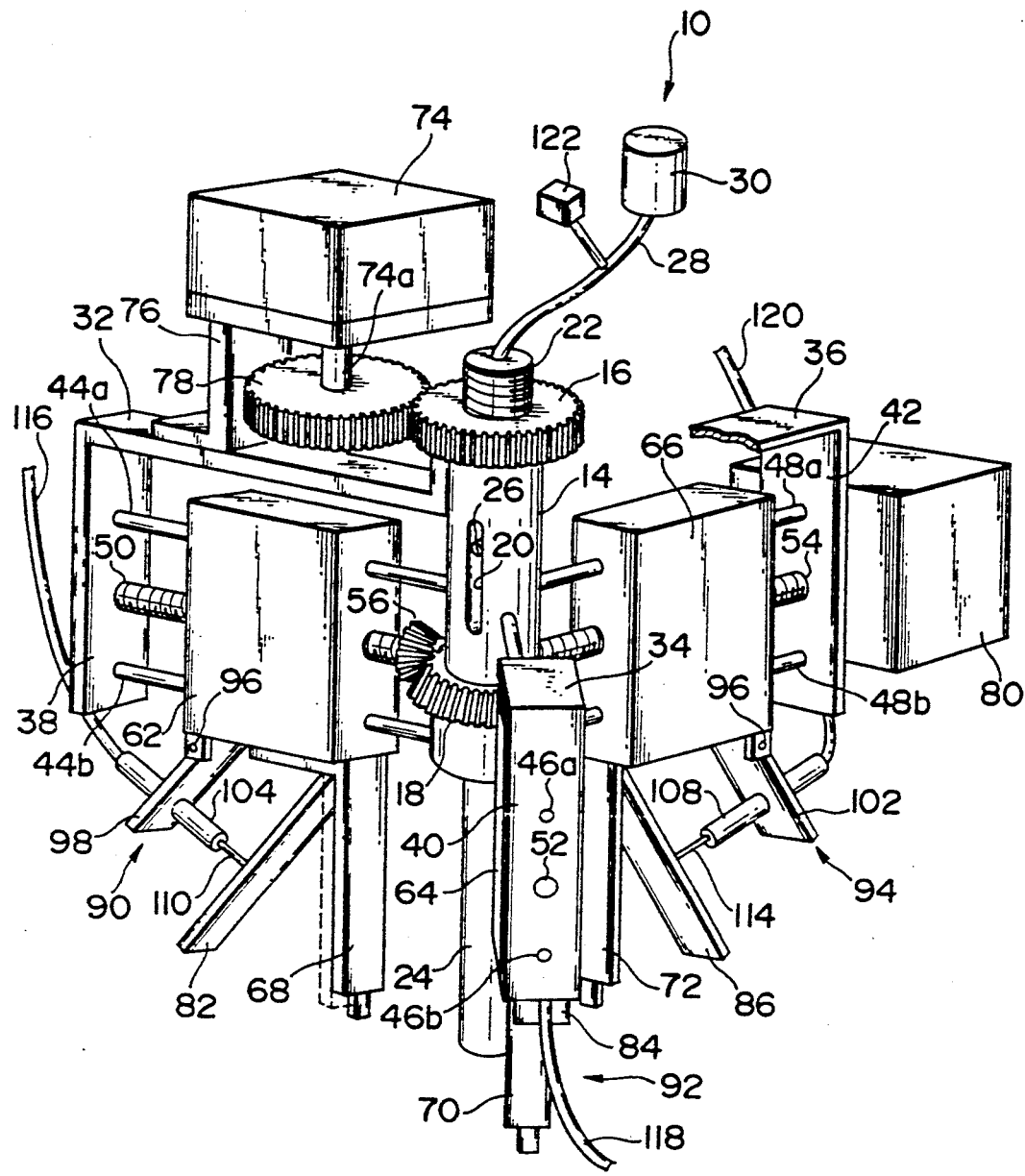
FIG. 1 is a perspective view showing an arrangement of a first embodiment of an article gripping apparatus according to the present invention.
Figure 2:
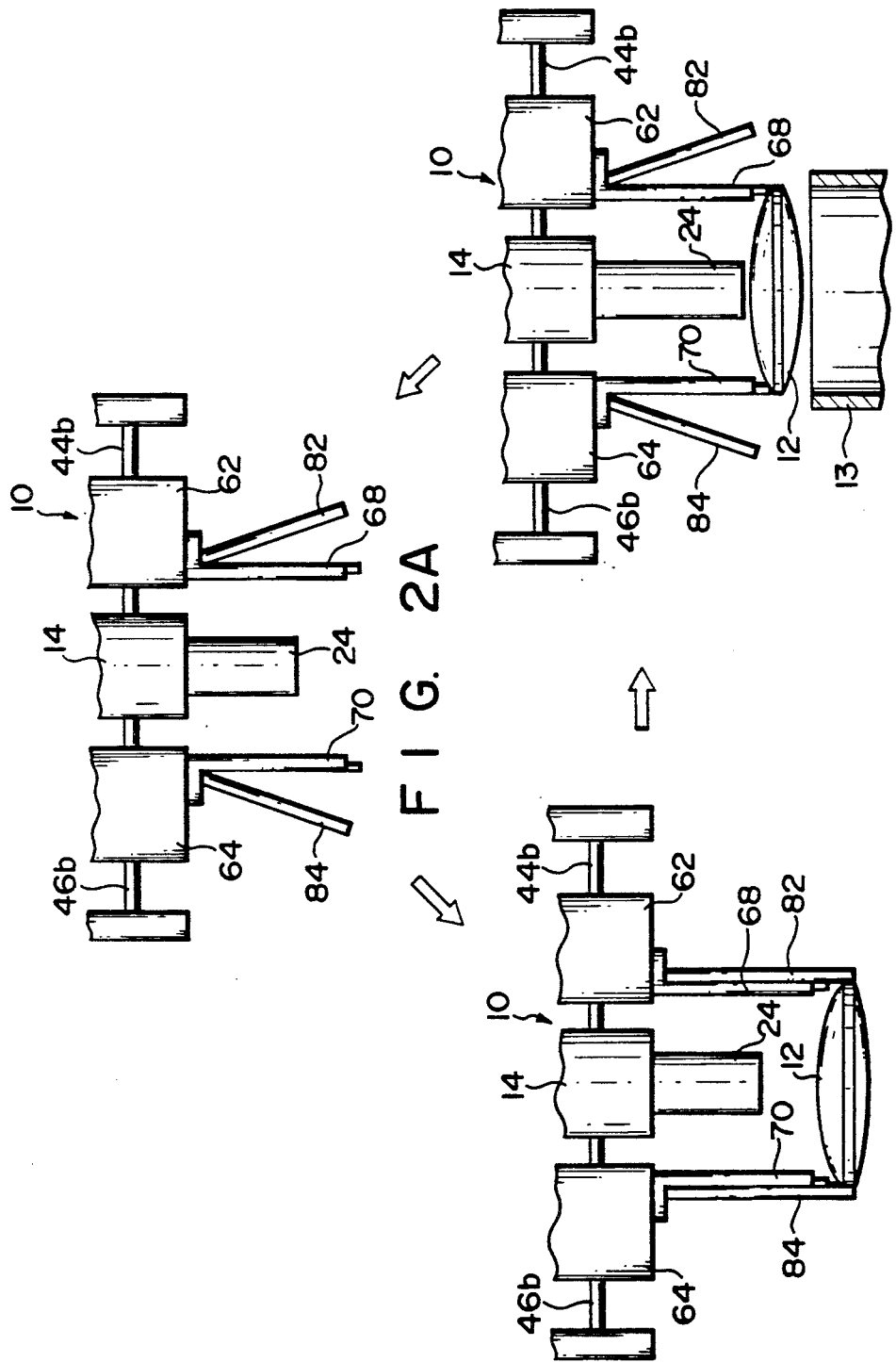
FIGS. 2A-2C is a front view schematically showing an operation state of the article gripping apparatus shown in FIG. 1.
Figure 3:
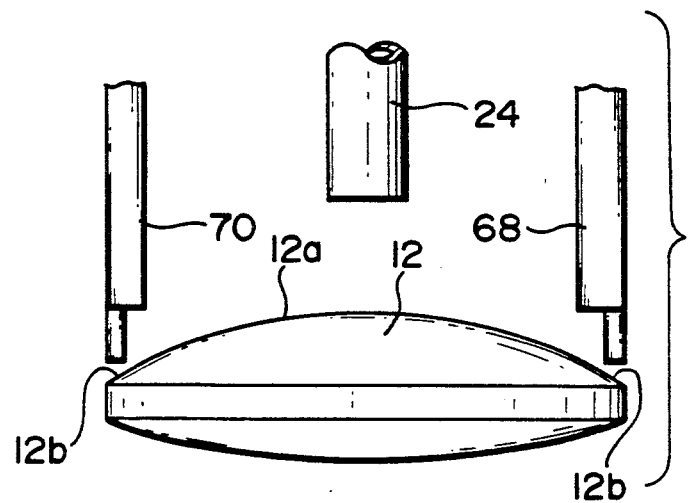
FIG. 3 is a front view showing a state wherein regulating segments approach a margin portion of an optical lens from the above.
Figure 4:
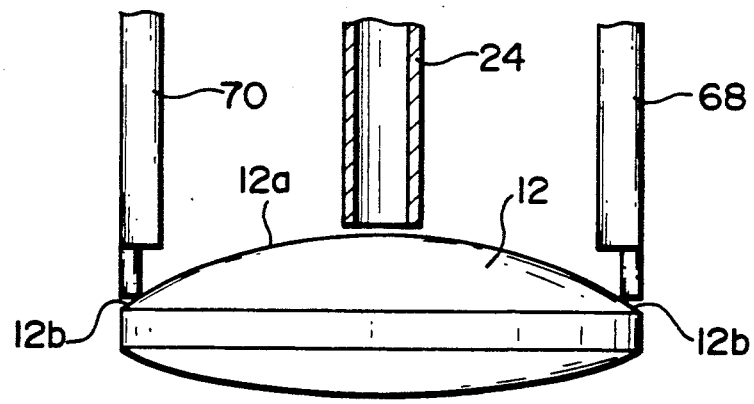
FIG. 4 is a front view showing a state wherein a suction pipe is moved downward and approaches an optical lens, and the optical lens is chucked and brought into contact with lower ends of regulating segments but does not contact the suction pipe.

As shown in FIG. 1, a robot hand 10 is replaceably attached to a lower end of a robot arm (not shown) in accordance with kinds of article to be chucked (i.e., absorbed). In the first embodiment, the robot hand 10 is attached to chuck and convey an optical lens 12 as an article. The central portion of the optical lens 12 is defined as an optical functional surface 12a which is precisely polished, and an outer peripheral edge other than the optical functional surface 12a is defined as a margin portion 12b which does not have a function associated with an optical system. Note that these reference numerals 12a and 12b are shown in FIGS. 3 and 4 for illustrative convenience.

The robot hand 10 comprises a hand body 14 which is detachably attached to the lower end of the robot arm, as shown in FIG. 1. The hand body 14 is formed into a hollow cylindrical shape having upper and lower open ends, and extends vertically. A spur gear 16 is coaxially and rotatably mounted on the upper end of the hand body 14, and a bevel gear 18 is coaxially and rotatably mounted on the lower end of the body 14. An elongated groove 20 is formed to extend vertically in the peripheral wall of the hand body 14.

A through hole is formed in the central portion of the spur gear 16. Although not shown, a female threaded groove is formed on the inner peripheral surface of this through hole. A suction pipe 24 integrally has a male threaded portion 22 meshed with the female threaded groove on its upper portion, and extends vertically in the hand body 14. The suction pipe 24 serves as a suction member. An engaging pin 26 which is inserted in the elongated groove 20 projects radially outwardly from the peripheral wall of the suction pipe 24. With this structure of the suction pipe 24, when the spur gear 16 is rotated, the suction pipe 24 is vertically moved in the hand body 14 through engagement between the engaging pin 26 and the elongated groove 20.

Note that the upper end of the suction pipe 24 is connected to a suction pump 30 through a tube 28. In this manner, when the suction pump 30 is driven, the lower open end of the suction pipe 24 performs a chucking operation, and draws the lens 12 adjacent thereto by a negative pressure.

Three angle members 32, 34, and 36 project radially outwardly from the outer peripheral surface of the upper portion of the above-mentioned hand body 14. These angle members 32, 34, and 36 are disposed at equal angular intervals in the circumferential direction, and bent segments 38, 40, and 42 which are bent downward are integrally formed on their distal ends. Pairs of guide rods 44a; 44b, 46a; 46b, and 48a; 48b, each pair of which extend radially and are vertically separated from each other, are respectively bridged between the segments 38, 40, and 42, and the hand body 14.

Screw rods 50, 52, and 54 respectively extend radially from the angle members 32, 34, and 36 to be located between corresponding pairs of guide rods 44a; 44b, 46a; 46b, and 48a; 48b. Outer end portions of the screw rods 50, 52, and 54 are rotatably supported by the corresponding bent segments 38, 40, and 42, and small bevel gears 56, 58, and 60 mesh with the bevel gear 18 and are coaxially and integrally attached to their inner end portions. Note that in FIG. 1, the small bevel gear 60 is behind the hand body 14, and is not illustrated.

Slide blocks 62, 64, and 66 are respectively disposed on the angle members 32, 34, and 36 to be slidable in the radial direction of the hand body 14 by the corresponding pairs of guide rods 44a; 44b, 46a; 46b, and 48a; 48b. The slide blocks 62, 64, and 66 are threadably engaged with the corresponding screw rods 50, 52, and 54. In this manner, when the bevel gear 18 is rotated, the slide blocks 62, 64, and 66 are simultaneously slid in the radial direction upon rotation of the screw rods 50, 52, and 54.

Regulating segments 68, 70, and 72 serving as finger members are respectively fixed to the lower surfaces of the slide blocks 62, 64, and 66 to depend downward. These regulating segments 68, 70, and 72 are disposed around the hand body 14 to be coaxial therewith. The lower ends of these regulating segments 68, 70, and 72 are set at an identical level, and are brought into contact with, from the above, the margin portion 12b defined on the outer peripheral edge of the upper surface of the optical lens 12.

A first driving motor 74 for vertically moving the suction pipe 24 is mounted on the upper surface of the first angle member 32 through a mounting stay 76. The first driving motor 74 has a driving shaft 74a projecting downward. A driving spur gear 78 meshed with the spur gear 16 is coaxially fixed to the driving shaft 74a to be integrally rotated therewith.

A second driving motor 80 for sliding the slide blocks 62, 64, and 66 in the radial direction is mounted on the outer side surface of the bent segment 42 of the third angle member 36. The driving motor 80 comprises a driving shaft which extends in the radial direction. The driving shaft is connected to and aligned with the screw rod 54 to be integrally rotated therewith.

Centering members 82, 84, and 86 for precisely positioning, i.e., centering the optical lens 12 with respect to the robot hand 10 prior to chucking the optical lens 12 are respectively arranged on the lower surface of the slide blocks 62, 64, and 66.

The centering members 82, 84, and 86 are supported on those upper ends of the corresponding regulating segments 68, 70, and 72, which are portions mounting with the corresponding slide blocks 62, 64, and 66, through pivot pins (not shown) to be pivotal in the vertical planes passing through slide paths of the corresponding slide blocks 62, 64, and 66. More specifically, the centering members 82, 84, and 86 are supported to be pivotal between standby positions (shown by solid lines in FIG. 1) separated outwardly from the corresponding regulating segments 68, 70, and 72 by a predetermined angular interval and centering positions (shown by broken lines in FIG. 1) where the centering members abut against the outer side surfaces of the corresponding regulating segments 68, 70, and 72.

The centering members 82, 84, and 86 are formed to slightly extend downward from the lower ends of the corresponding regulating segments 68, 70, and 72.

Air cylinder mechanisms 90, 92, and 94 are respectively connected to pivot the centering members 82, 84, and 86 between the standby positions and the centering positions. The air cylinder mechanisms 90, 92, and 94 are constituted by mounting segments 98, 100, and 102 supported at the rear ends of the corresponding slide blocks 62, 64 and 66 through pivot pins 96 so as to be rotatable in the same planes as the corresponding centering members 82, 84, and 86, cylinder bodies 104, 106, and 108 mounted on the corresponding mounting segments 98, 100, and 102, pistons 110, 112, and 114 which are arranged in the corresponding cylinder bodies 104, 106, and 108 to be retractable in accordance with an air pressure, and distal ends of which are pivotally supported on the corresponding centering members 82, 84, and 86, pipes 116, 118, and 120 for supplying compressed air to the corresponding cylinder bodies 104, 106, and 108, and a compressed air source (not shown) for supplying compressed air to the cylinder bodies 104, 106, and 108 through these pipes 116, 118, and 120. Note that the mounting segment 100, the cylinder body 106, and the piston 112 are not illustrated.

Although not shown in detail, a pressure detector 122 for detecting a negative pressure state generated at the lower open end of the suction pipe 24 is attached to the suction pump 30. Through the pressure detector 122, a suction force by the suction pipe 24 is detected.

An operation for chucking and conveying the optical lens 12 using the robot hand 10 with the above arrangement will be explained below.

In the standby state of the convey operation, the robot arm brings its robot hand 10 to a position shown in FIG. 2A. In this standby state, the centering members 82, 84, and 86 are located at the standby positions separated outwardly from the corresponding regulating segments 68, 70, and 72, the suction pipe 24 is located at its upper position, and the regulating segments 68, 70, and 72 are deviated radially outwardly.

From this standby state, when an instruction is sent from a control apparatus (not shown) so as to chuck a predetermined optical lens and assemble it in a lens barrel (not shown), the robot arm is moved so that the robot hand 10 is located at a position above a stage on which the optical lens 12 is placed. On the other hand, the second driving motor 80 is started to rotate the screw rod 54 about its axis. Upon rotation of the screw rod 54, the slide block 66 is moved along the radial direction of the hand body 14.

The rotational drive force of the screw rod 54 is transmitted to the bevel gear 18 through threaded engagement between the bevel gear 60 coaxially fixed to its distal end and the bevel gear 18 rotatably mounted on the hand body 14. Upon rotation of the bevel gear 18, the bevel gears 56 and 58 meshed with the gear 18 are also rotated, thereby rotating the screw rods 50 and 52. Thus, the remaining slide blocks 62 and 64 are also radially moved.

Note that the drive amount of the second driving motor 80, i.e., the moving amounts of the slide blocks 62 and 64 are set in accordance with the outer diameter of the optical lens 12 to be chucked so that the lower ends of the regulating segments 68, 70, and 72 are located just above the margin portion 12b defined on the outer peripheral edge portion of the optical lens 12, and more specifically, the outer side surfaces of the regulating segments 68, 70, and 72 are brought to positions matching the outer peripheral edge of the optical lens 12.

When the robot hand 10 is brought to a position above the optical lens 12 to be chucked, the robot arm is then moved downward, and its downward movement is stopped immediately before the lower ends of the three regulating segments 68, 70, and 72 of the robot hand 10 are brought into contact with the upper surface of the margin portion 12b at the optical lens 12. Thereafter, the air cylinder mechanisms 90, 92, and 94 are started so as to pivot the corresponding centering members 82, 84, and 86 from the standby positions to the centering positions as shown in FIG. 2B. As a result, if the central position of the optical lens 12 is offset from the central position of the hand body 14, the lens 12 is displaced to be precisely matched with the central position of the hand body 14 upon pivotal movement of the three centering members 82, 84, and 86 to the centering positions, thus executing a so-called centering operation.

In this manner, when the centering operation of the optical lens 12 is executed, the regulating segments 68, 70, and 72 are located immediately above the margin portion 12b of the optical lens 12.

From this state, the suction pump 30 is started, and the chucking operation by the suction pipe 24 is started. At the same time, the first driving motor 74 is driven to rotate the spur gear 16, thereby moving the suction pipe 24 downward. In this manner, the lower open end of the suction pipe 24 gradually approaches the central portion (included in the optical functional surface 12a) of the upper surface of the optical lens 12 from above. On the other hand, a detection operation of a suction pressure (negative pressure) by the pressure detector 122 is started.

When the suction pipe 24 is moved downward, the negative pressure generated at its lower open end is gradually increased. When the pressure detected by the pressure detector 122 has reached a pressure about 80% of a maximum vacuum pressure, the first driving motor 74 is stopped. Note that the maximum vacuum pressure is defined by a negative pressure generated when the chucking operation is executed in a state wherein the suction pipe 24 is in tight contact with the optical lens 12. When a pressure of about 80% of the maximum vacuum pressure has been reached, the lower end of the suction pipe 24 is located slightly above the upper surface of the optical lens 12, as shown in FIG. 4.

More specifically, in the first embodiment, the weight of the optical lens is a maximum of 100 g, and the maximum vacuum pressure is set to be about 600 mmHg. Under these conditions, the suction negative pressure about 80% of the maximum vacuum pressure is 480 mmHg. A distance between the suction pipe 24 and the optical lens 12 when this suction negative pressure is attained is 0.03 mm, and a suction force obtained at this suction negative pressure is about 250 g. In this manner, in the first embodiment, the optical lens 12 is chucked and can be lifted while the suction pipe 24 is not in contact with the optical lens 12.

In this manner, a negative pressure generated in a state wherein the lower end of the suction pipe 24 is located slightly above the upper surface of the optical lens 12 is set to be a value high enough to bias the optical lens 12 upward. As a result, based on this negative pressure, the optical lens 12 is biased against the lower ends of the three regulating segments 68, 70, and 72 from below, and the optical lens 12 is accordingly held by the robot hand 10.

Upon vertical and sideward movement of the robot arm, the robot hand 10 chucking and holding the optical lens 12 is moved to a position above a location where a lens barrel 13 is placed as shown in FIG. 2C. In this state, the air cylinder mechanisms 90, 92, and 94 are stopped. More specifically, supply of compressed air from the compressed air source (not shown) is stopped, and the pistons 110, 112, and 114 are retracted in the corresponding cylinder bodies 104, 106, and 108. Upon this retraction, the centering members 82, 84, and 86 are pivoted from their centering positions to the outer standby positions.

After the centering operation by the centering members 82, 84, and 86 is released, the optical lens 12 is conveyed to a predetermined position in the lens barrel 13 upon downward movement of the robot arm. In this state, the suction pump 30 is stopped and the chucking state of the optical lens 12 to the robot hand 10 is released. The optical lens 12 is therefore released, and is housed and held in the lens barrel 13.

Thereafter, the robot hand 10 is moved to and held at the above-mentioned standby position, thus completing a series of convey operations of the optical lens 12.

As has been described above in detail, according to the robot hand 10 of the first embodiment, the optical lens 12 as an article to be conveyed thereby is conveyed in a state wherein the lens is chucked and held without bringing any member into contact with the optical functional surface 12a. In particular, the regulating segments 68, 70, and 72 which are in contact with the optical lens 12 are set to abut against the margin portion 12b of the optical lens 12. In this manner, upon conveyance, the optical functional surface 12a of the optical lens 12 can be absolutely prevented from being damaged.

According to the robot hand 10 of the first embodiment, members for holding the optical lens 12 are present inside the outer periphery of the optical lens 12 to be conveyed. Therefore, the optical lens 12 can be housed and held in the lens barrel 13 without any interference.

The present invention is not limited to the first embodiment described above, and various changes and modifications may be made within the spirit and scope of the invention.

For example, in the first embodiment, the present invention is applied to the optical lens 12 as an article. However, the present invention is not limited to this, and can be applied to any article. In particular, the present invention is effective when the surface of an article to be chucked has a functional surface which must be prevented from contacting any other member, and a margin portion 12b which does not influence the function of the article upon contact with any other member.

In the first embodiment described above, three regulating segments are arranged, as indicated by reference numerals 68, 70, and 72. However, the present invention is not limited to this, and the number of the regulating segments need only be two or more.

A second embodiment of the present invention will be described hereinafter with reference to FIGS. 5 and 6.

In the following description, the same reference numerals denote the same parts as in the first embodiment, and a detailed description thereof will be omitted.

Figure 5:
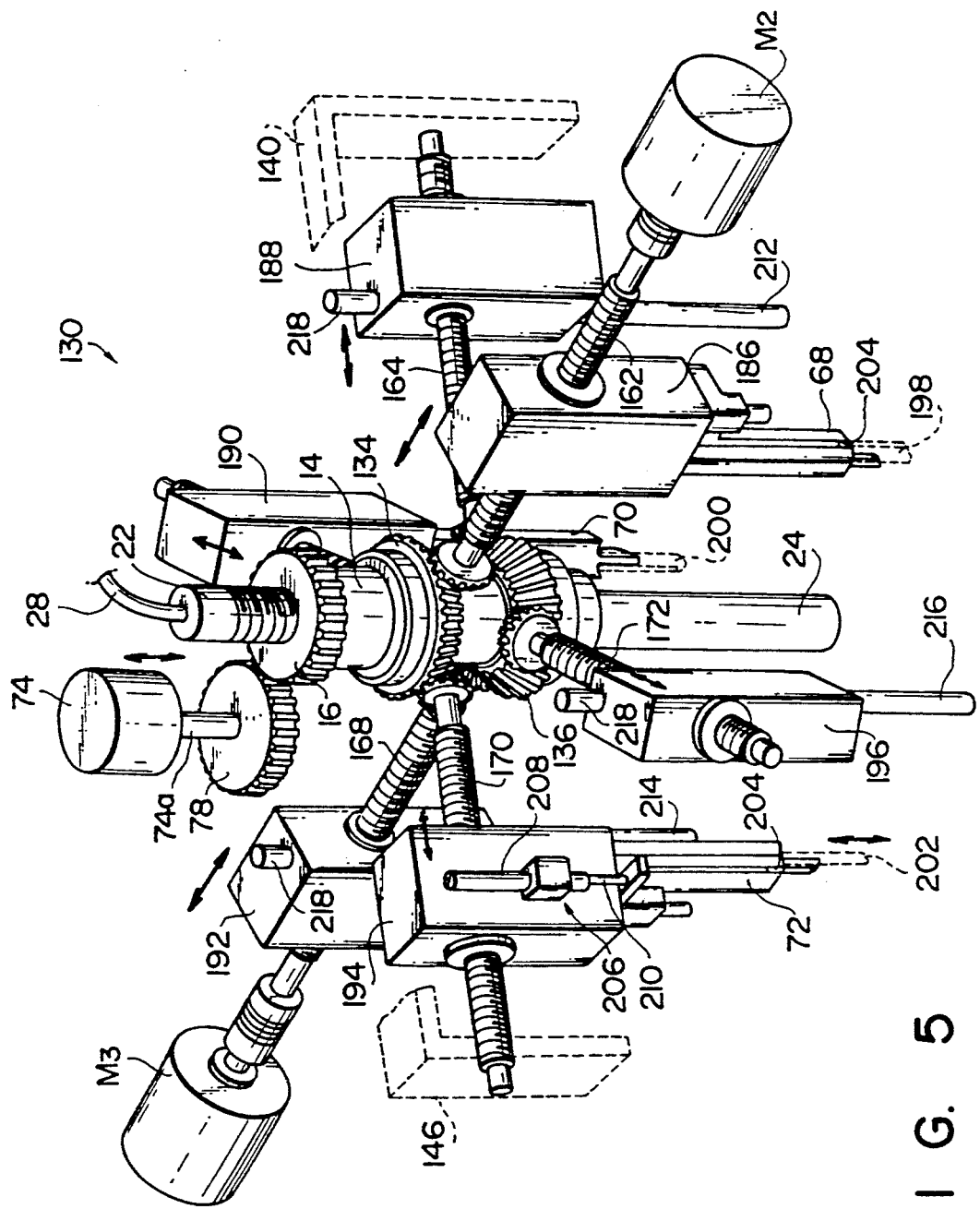
FIG. 5 is a perspective view showing an arrangement of a second embodiment of an article gripping apparatus according to the present invention.

As shown in FIG. 5, a robot hand 130 according to the second embodiment of the present invention is attached to the lower end of a robot arm (not shown) for the purpose of versatile use for a variety of articles. In the second embodiment, an optical lens 12 as a first article can be chucked and held as in the first embodiment and can be gripped to be held from below, and a C ring 132 as a second article can be chucked and conveyed to the lens barrel 13 and can be inserted and mounted in the lens barrel 13.

The robot hand 130 comprises the hand body 14 detachably attached to the lower end of the robot arm as in the first embodiment. The hand body 14 extends vertically, and a first bevel gear 134 is coaxially and rotatably mounted on the middle portion of the hand body 14 along its axial direction. A second bevel gear 136 is coaxially mounted on the lower end of the hand body 14 to be rotatable independently of the first bevel gear 134. The suction pipe 24 vertically projects from the hand body 14 as in the first embodiment.

Six angle members 138, 140, 142, 144, 146, and 148 are integrally mounted on the outer surface of the upper portion of the hand body 14 to extend radially outwardly. These angle members 138, 140, 142, 144, 146, and 148 are disposed on the hand body 14 at equal angular intervals, i.e., 60°. Downwardly bent segments 138a, 140a, 142a, 144a, 146a, and 148a are integrally formed on the distal ends of the angle members, respectively. Pairs of guide rods 150a; 150b, 152a; 152b, 154a; 154b, 156a; 156b, 158a; 158b, and 160a; 160b, each pair of which extend radially and are separated vertically are bridged between the bent segments 138a, 140a, 142a, 144a, 146a, and 148a and the hand body 14, respectively.

Screw rods 162, 164, 166, 168, 170, and 172 are disposed on the angle members 138, 140, 142, 144, 146, and 148 between the corresponding pairs of guide rods 150a; 150b, 152a; 152b, 154a; 154b, 156a; 156b, 158a; 158b, and 160a; 160b, respectively.

Every other screw rod, i.e., three screw rods 162, 166, and 170 (first group), extend in the same plane as a rotational plane of the upper first bevel gear 134. The remaining three screw rods 164, 168, and 172 (second group) extend at positions different from those of the first group in the axial direction and in the same plane as a rotational plane of the lower second bevel gear 136.

The outer end portions of the six screw rods 162, 164, 166, 168, 170, and 172 are rotatably supported on the corresponding bent segments 138a, 140a, 142a, 144a, 146a, and 148a. Small bevel gears 174, 178, and 182 meshed with the first bevel gear 134 described above are coaxially and integrally attached to the inner end portions of the screw rods 162, 166, and 170 (first group), respectively. Small bevel gears 176, 180, and 184 meshed with the second bevel gear 136 described above are coaxially and integrally attached to the inner end portions of the screw rods 164, 168, and 172 (second group), respectively.

Slide blocks 186, 188, 190, 192, 194, and 196 are arranged to be slidably supported by the corresponding pairs of guide rods 150a; 150b, 152a; 152b, 154a; 154b, 156a; 156b, 158a; 158b, and 160a; 160b, in the radial direction of the hand body 14 between the hand body 14 and the bent segments 138a, 140a, 142a, 144a, 146a, and 148a of the angle members 138, 140, 142, 144, 146, and 148. The slide blocks 186, 188, 190, 192, 194, and 196 are threadably engaged with the corresponding screw rods 162, 164, 166, 168, 170, and 172, respectively.

When the first bevel gear 134 is rotated, the screw rods 162, 166, and 170 (first group) are rotated. Upon rotation of these rods, the slide blocks 186, 190, and 194 (first group) are simultaneously slid along the radial direction.

When the second bevel gear 136 is rotated, the screw rods 164, 168, and 172 (second group) are rotated. Upon rotation of these rods, the slide blocks 188, 192, and 196 (second group) are simultaneously slid along the radial direction.

Regulating segments 68, 70, and 72 which are brought into contact with the margin portion 12b defined on the outer peripheral edge of the upper surface of the optical lens 12 as the first article from above as described in the first embodiment are mounted on the slide blocks 186, 190, and 194 (first group) with the above arrangement. These regulating segments 68, 70, and 72 also serve as gripping segments which are brought into contact with the outer periphery of the C ring 132 as the second article, and grip the C ring while reducing its radius.

A second driving motor $M_2$ for sliding the slide blocks 186, 190, and 194 (first group) in the radial direction are attached to the outer side surface of the bent segment 138a of the first angle member 138. The second driving motor $M_2$ comprises a driving shaft which extends radially. The driving shaft is connected to and aligned with the screw rod 162 to be integrally rotated while being matched therewith.

A third driving motor $M_3$ for sliding the slide blocks 188, 192, and 196 (second group) in the radial direction are attached to the outer side surface of the bent segment 144a of the fourth angle member 144. The third driving motor $M_3$ comprises a driving shaft which extends radially. The driving shaft is connected to and aligned with the screw rod 168 to be integrally rotated while being matched therewith.

Pressing members 198, 200, and 202 for pressing the C ring 132 gripped by the regulating segments 68, 70, and 72 downward in the axial direction thereof to release a gripped state are mounted on the regulating segments 68, 70, and 72 to be movable in the axial direction. The pressing members 198, 200, and 202 are disposed to be slid in elongated grooves 204 which are formed in the corresponding regulating segments 68, 70, and 72 to extend in the axial direction, as shown in FIG. 5. Note that this disposition state is set such that the lower ends of the pressing members 198, 200, and 202 projecting downward from the corresponding elongated grooves 204 can be brought into contact with the upper surface of the C ring 132 gripped by the regulating segments 68, 70, and 72 from the above.

The pressing members 198, 200, and 202 are pressed in the corresponding elongated grooves 204 by a plurality of removal preventing lock members (not shown) in order to prevent removal from the corresponding elongated grooves 204.

First air cylinder mechanisms 206 for reciprocally moving the corresponding pressing members 198, 200, and 202 in the axial direction are provided to the slide blocks 186, 190, and 194, respectively. Each first air cylinder mechanism 206 comprises a cylinder body 208 mounted on the side surface of the corresponding one of the slide blocks 186, 190, and 194, and a piston 210 arranged in the cylinder body 208 to be projectable/retractable in the axial direction. Each cylinder body 208 is connected to a compressed air source (not shown) for supplying compressed air thereto. Each piston 210 is connected to the corresponding one of the pressing members 198, 200, and 202 to be moved together therewith.

Since the first air cylinder mechanisms 206 are arranged as described above, the pistons 210 are pushed out downward in the axial direction from the corresponding cylinder bodies 208 upon supply of compressed air into the cylinder bodies 208, and the lower ends of the pressing members 198, 200, and 202 connected to these pistons 210 are brought to positions below the corresponding regulating members 68, 70, and 72.

Figure 6:
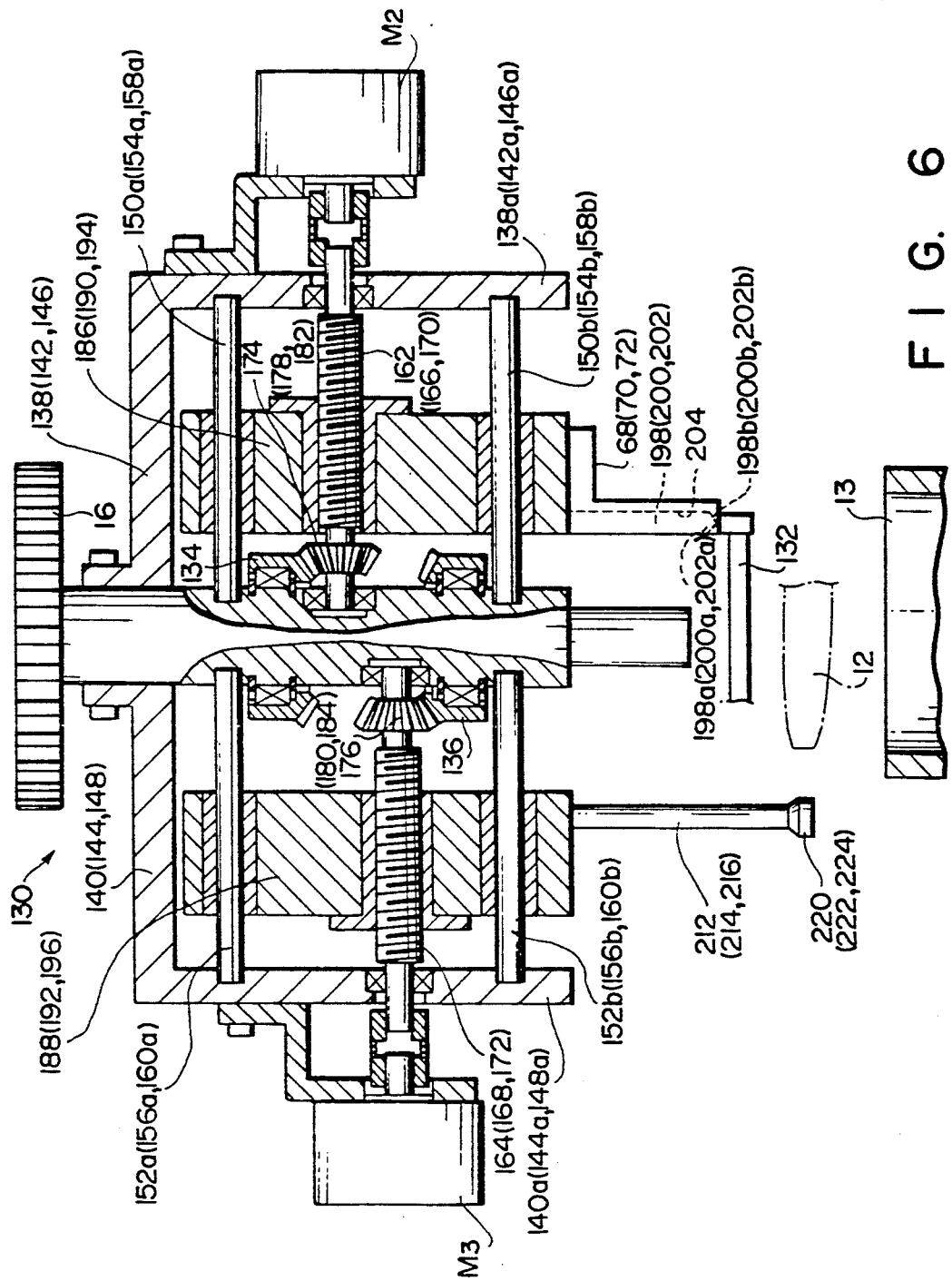
FIG. 6 is a partially cutaway front view of the arrangement of the article gripping apparatus shown in FIG. 5.

Pairs of inclined surfaces 198a; 198b, 200a; 200b, and 202a; 202b are respectively formed on the lower end portions of the pressing members 198, 200, and 202, respectively, as shown in FIG. 6. Each pair of inclined surfaces intersect each other at an acute angle to be symmetrical about the central axis of the corresponding pressing members 198, 200, and 202. More specifically, the inclined surfaces 198b, 200b, and 202b located radially outwardly serve as surfaces for pressing the C ring 132 downward.

Vertically movable centering members 212, 214, and 216 are attached to the slide blocks 188, 192, and 196, respectively, (second group) to extend vertically. In order to vertically move the centering members 212, 214, and 216, second air cylinder mechanisms 218 are attached to the upper surfaces of the corresponding slide blocks 188, 192, and 196. These second air cylinders 218 are driven by a compressed air source (not shown) in the same manner as in the first air cylinder mechanisms 206 described above.

Large-diameter portions 220, 222, and 224 are integrally formed on the lower ends of the centering members 212, 214, and 216.

In the robot hand 130 arranged as described above, operations for assembling the optical lens 12 in the lens barrel 13 and fixing the lens 12 in the lens barrel 13 using the C ring 132 will be described below.

In a standby state of the gripping operation, all the slide blocks 186, 188, 190, 192, 194, and 196 are deviated radially outwardly in the robot hand 130. When the robot receives an instruction from a controller (not shown) so as to assemble a predetermined optical lens 12 in the lens barrel 13, the robot moves the robot hand 130 to a position where the robot hand 130 can grip the lens barrel 13 placed on a table (not shown). The third driving motor $M_3$ is then rotated in the normal direction to slide the second group of slide blocks 188, 192, and 196 radially inwardly. Thus, the lens barrel 13 is gripped from the outside by the centering members 212, 214, and 216 attached to the slide blocks 188, 192, and 196.

The robot hand 130 gripping the lens barrel 13 is moved to a position above a jig (not shown), and places and fixes the lens barrel 13 on the jig. Thereafter, the third driving motor $M_3$ is rotated in the reverse direction to slide the centering members 212, 214, and 216 radially outwardly, thus releasing a gripped state of the lens barrel 13. In this manner, the lens barrel 13 is independently fixed on the jig.

Thereafter, the robot arm is moved so that the robot hand 130 is located above a stage (not shown) on which the optical lens 12 is placed. The robot hand 130 is then moved downward upon downward movement of the robot arm, and the second driving motor $M_2$ is rotated in the normal direction. Thus, the lower end faces of the regulating segments 68, 70, and 72 are located above the margin portion 12b of the optical lens 12. At the same time, the second air cylinder mechanisms 218 are started, so that the large-diameter portions 220, 222, and 224 of the centering members 212, 214, and 216 are located immediately below the optical lens 12.

In this state, the third driving motor $M_3$ is rotated in the normal direction, and the slide blocks 188, 192, and 196 (second group) are moved inwardly along the radial direction of the hand body 14. Upon slide movement of the second group of slide blocks 188, 192, and 196, the centering members 212, 214, and 216 approach the optical lens 12 from the outside, and contact its outer peripheral surface, thus centering the optical lens 12.

On the other hand, at the same time with the centering operation of the optical lens 12, the large-diameter portions 220, 222, and 224 of the centering members 212, 214, and 216 are located immediately below the outer peripheral edge portion of the lower surface of the optical lens 12. Thereafter, upon upward movement of the robot arm, the optical lens 12 is lifted up while being held by the three large-diameter portions 220, 222, and 224 from the below.

The robot arm is then moved to displace the robot hand 130 to a position above the lens barrel 13 fixed on the jig. During movement, the second air cylinder mechanisms 218 move the corresponding centering members 212, 214, and 216 upward. As a result, the lower ends of the regulating segments 68, 70, and 72 are brought into contact with the margin portion 12b of the optical lens 12 held by the large-diameter portions 220, 222, and 224 from below.

Thereafter, the first driving motor 74 is rotated in the normal direction, and the suction pipe 24 projects downward from the hand body 14 and is moved downward to a position slightly separated upward from the upper surface of the optical lens 12 as in the operation of the first embodiment. In this manner, the optical lens 12 is chucked in a state wherein its optical functional surface 12a does not contact the suction pipe 24.

In this manner, after the optical lens 12 is chucked and held by the suction pipe 24, the third driving motor $M_3$ is rotated in the reverse direction so as to slide the centering members 212, 214, and 216 radially outwardly. At the same time, the air cylinder mechanisms 218 are started to be moved downward, thereby releasing the locked state of the optical lens 12 by the large-diameter portions 220, 222, and 224 of the centering members. As a result, the optical lens 12 is independently chucked and held by the suction pipe 24 and three regulating segments 68, 70, and 72 in a state wherein the suction pipe 24 does not contact the functional surface 12a of the optical lens 12.

Thereafter, when the robot hand 130 is brought to a position immediately above the lens barrel 13 held on the jig, the third driving motor $M_3$ is rotated again in the normal direction, so that the centering members 212, 214, and 216 grip the outer periphery of the lens barrel 13. As a result, the central axis of the lens barrel 13 held on the jig is caused to precisely coincide with the central axis of the optical lens 12 chucked and held by the robot hand 130 through a compliance mechanism (not shown) interposed between the robot arm and the robot hand 130.

From this state, the robot arm is moved downward, and the optical lens 12 chucked and held by the robot hand 130 can be satisfactorily inserted from the above into the lens barrel 13. Thereafter, the suction operation of the suction source of the suction pipe 24 is stopped, and the optical lens 12 is solely housed and held in a predetermined position in the lens barrel 13.

Thereafter, the centering members 212, 214, and 216 are opened outwardly, the robot arm is moved upward, and the suction pipe 24 and the regulating segments 68, 70, and 72 of the robot hand 130 are removed from the lens barrel 13. Then, a gripping/mounting operation of the C ring 132 is executed in order to fix the optical lens 12 in the lens barrel 13.

More specifically, when insertion of the optical lens 12 is completed, the robot arm sets, based on an instruction from a controller (not shown), the robot hand 130 in a standby state wherein the regulating segments 68, 70, and 72, and the centering members 212, 214, and 216 are deviated radially outwardly. In this standby state, the compressed air source is kept deenergized. In the first air cylinder mechanisms 206, the pistons 210 are retracted in the corresponding cylinder bodies 208.

When the robot receives an instruction from the controller (not shown) so as to grip a predetermined C ring 132 and mount it in the lens barrel 13, the robot arm is moved so that the robot hand 130 is located above a stage on which the C ring 132 is placed. The robot arm is moved downward so that the regulating segments 68, 70, and 72 are located aside the C ring 132 to be gripped.

Thereafter, the second driving motor $M_2$ is rotated in the normal direction, and the slide blocks 186, 190, and 194 (first group) are moved inwardly along the radial direction of the hand body 14.

The drive amount of the second driving motor $M_2$, i.e., the moving amounts of the slide blocks 186, 190, and 194 are set such that the lower ends of the corresponding regulating segments 68, 70, and 72 reduce the radius of the outer peripheral surface of the C ring 132 to be gripped in a natural state to be smaller than the radius of the inner peripheral surface of the lens barrel 13. When the slide blocks 186, 190, and 194, i.e., the regulating segments 68, 70, and 72 are moved radially inwardly by the moving amounts set as described above, the C ring 132 is gripped while its radius is reduced by these regulating segments 68, 70, and 72.

The robot hand 130 is moved vertically and horizontally while gripping the C ring 132 through the regulating segments 68, 70, and 72, so that the gripped C ring 132 is inserted in the lens barrel 13 from the above.

Thereafter, the compressed air source (not shown) is driven to supply compressed air to the cylinder bodies 208 of the first air cylinder mechanisms 206. Upon supply of compressed air, the pistons 210 project from the corresponding cylinder bodies 208, and the pressing members 198, 200, and 202 connected thereto are pressed downward. By the pressing operation of the pressing members 198, 200, and 202, their lower ends are brought into contact with the upper surface of the C ring 132 gripped by the regulating segments 68, 70, and 72 from the above, thereby pressing the C ring 132 downward.

The C ring 132 is pressed downward and released from the regulating segments 68, 70, and 72, and is expanded to recover its radius by its elasticity. As a result, the gripped state of the C ring 132 is released, and the ring 132 is expanded in the lens barrel 13. In this manner, the C ring 132 is fitted in a fitting groove 110 formed in the inner surface of the lens barrel 13.

When the lower ends of the regulating segments 68, 70, and 72 are sufficiently inserted in the lens barrel 13, in other words, when they are inserted in the lens barrel 13 to positions immediately above the optical lens 12 mounted in advance, the C ring 132 is satisfactorily fitted in the fitting groove formed immediately above the optical lens 12 upon pressing operation of the pressing members 198, 200, and 202.

However, if insertion of these regulating segments 68, 70, and 72 is insufficient, the C ring 132 is expanded on an inner surface portion above the fitting groove. In this state, the C ring 132 cannot be fitted in the fitting groove.

In order to prevent such a situation, the first air cylinder mechanisms 206 continue to press the pressing members 198, 200, and 202 downward. For this reason, the C ring 132, which is released from the gripping state by the regulating segments 68, 70, and 72, is further pressed downward while being biased outwardly by the inclined surfaces 198b, 200b, and 202b formed on the lower surfaces of the pressing members 198, 200, and 202 and located radially outwardly.

In this manner, the C ring 132 is forcibly pressed into the fitting groove, in other words, the C ring 132 is reliably fitted in the fitting groove. Thereafter, the robot hand 130 is removed upward from the lens barrel 13 upon upward movement of the robot arm, and is brought to its standby position.

A series of fitting operations of the C ring 132 into the lens barrel 13 by the robot hand 130 are completed.

According to the second embodiment, as described above, operations for fitting the lens barrel 13 on the jig, inserting the optical lens 12 into the lens barrel 13, and fitting the C ring 132 into the lens barrel 13 can be successively executed by the single robot hand 130.

A third embodiment of an article gripping apparatus according to the present invention will be described below with reference to FIGS. 7 to 10D. In the third embodiment, an article detaching mechanism is equipped in gripping members 68, 70, and 72 of the gripping apparatus according to the first embodiment.

An article detaching mechanism 232 equipped in a robot hand 230 of the third embodiment will be explained below. In the following description, the same reference numerals denote the same parts as in the first and second embodiments.

Figure 7:
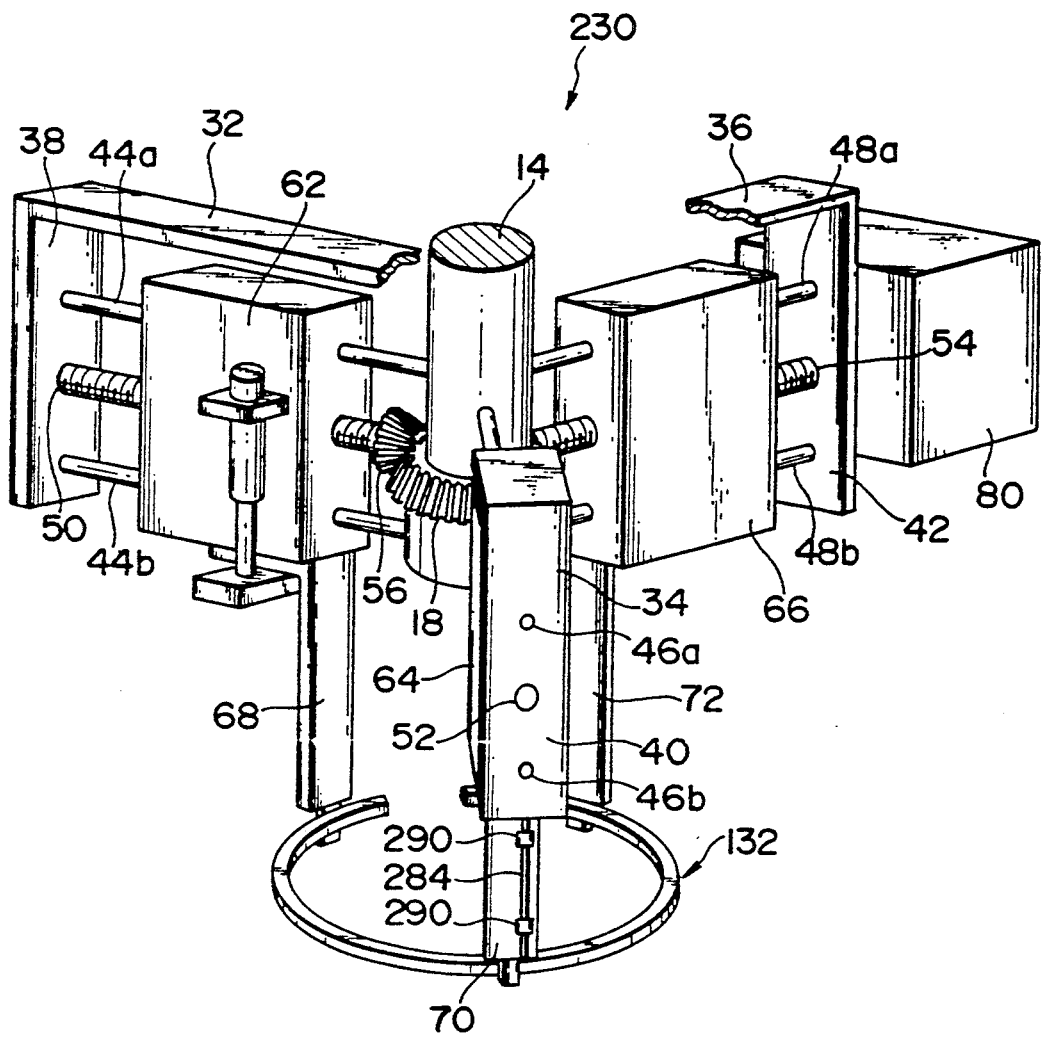
FIG. 7 is a perspective view showing an arrangement of a third embodiment of an article gripping apparatus according to the present invention.

As shown in FIG. 7, article detaching mechanisms 232 are attached to the gripping segments 68, 70, and 72, respectively, and comprise axially movable pressing members 282, 284, and 286 for pressing a C ring 132 gripped by these gripping segments 68, 70, and 72 downward and releasing the gripping state. The pressing members 282, 284, and 286 are disposed to be slid in elongated grooves 288 formed in the corresponding gripping segments 68, 70, and 72 to extend along the axial direction thereof, as shown in FIG. 8. Note that this disposition state is set such that the lower ends of the pressing members 282, 284, and 286 projecting downward from the corresponding elongated grooves 288 can be brought into contact with the upper surface of the C ring 132 gripped by the gripping segments 68, 70, and 72 from the above.

As shown in FIG. 8, the pressing members 282, 284, and 286 are pressed in the corresponding grooves 288 by a plurality of removal preventing lock members 290 in order to prevent removal from the corresponding elongated grooves 288.

Air cylinder mechanisms 292, 294, and 296 for reciprocally moving the corresponding pressing members 282, 284, and 286 in the axial direction are provided to the slide blocks 62, 64, and 66, respectively. The air cylinder mechanisms 292, 294, and 296 respectively comprise cylinder bodies 298, 300, and 302 attached to the side surfaces of the corresponding slide blocks 62, 64, and 66, and pistons 304, 306, and 308 arranged in the corresponding cylinder bodies 298, 300, and 302 to be projectable/retractable in the axial direction. These cylinder bodies 298, 300, and 302 are respectively connected to a compressed air source for supplying compressed air thereto. The pistons 304, 306, and 308 are connected to the corresponding pressing members 282, 284, and 286 to be moved together therewith.

Since the air cylinder mechanisms 292, 294, and 296 are arranged as described above, the pistons 304, 306, and 308 are pushed out downward in the axial direction from the corresponding cylinder bodies 298, 300, and 302 upon supply of compressed air into the cylinder bodies 298, 300, and 302 from the compressed air source (not shown). Thus, the lower ends of the pressing members 282, 284, and 286 connected to these pistons 304, 306, and 308 are brought to positions below the corresponding gripping segments 68, 70, and 72.

As shown in FIG. 9, pairs of inclined surfaces 282a; 282b, 284a; 284b, and 286a; 286b are respectively formed on the lower end portions of the pressing members 282, 284, and 286. Each pair of the inclined surfaces intersect at an acute angle to be symmetrical about the central axis of the corresponding pressing members 282, 284, and 286. More specifically, the inclined surfaces 282b, 284b, and 286b located radially inwardly serve as surfaces for pressing the C ring 132 downward.

As shown in FIG. 9, the optical lens 12 is inserted in advance in the inner surface of the lens barrel 13, and is supported while its outer peripheral portion abuts against a stepped portion formed in the inner surface of the lens barrel 13. More specifically, in this state, the optical lens 12 is set in a state wherein it is movable toward an insertion end portion, in other words, it can be removed. For this reason, in the third embodiment, in order to prevent removal of the optical lens 12, an annular fitting groove 310 in which the expanded C ring 132 is inserted and fitted is formed in the insertion end portion of the inner surface of the lens barrel 13 in which the lens 12 is inserted.

Operations for gripping the C ring 132 while its radius is reduced, inserting the C ring into the lens barrel 13, and fitting it into the fitting groove 310 using the robot hand 230 with the above arrangement will be explained hereinafter.

In an inactive state, the robot arm brings the robot hand 230 to a standby state based on an instruction from a controller (not shown). In this standby state, the gripping segments 68, 70, and 72 are deviated radially outwardly. In this standby state, the compressed air source is not energized, and in the air cylinder mechanisms 292, 294, and 296, their pistons 304, 306, and 308 are retracted in the corresponding cylinder bodies 298, 300, and 302, respectively.

From this standby state, when the robot receives an instruction from the controller (not shown) to grip a predetermined C ring 132 and assemble it into the lens barrel 13, the robot arm is moved so that the robot hand 230 is located above a stage (not shown) on which the C ring 132 is placed. The robot arm is moved downward so that the lower ends of the gripping segments 68, 70, and 72 are located aside the C ring 132 to be gripped.

Thereafter, a driving motor 80 is started to rotate a screw rod 54 about its axis. Upon rotation of the screw rod 54, the slide block 66 is moved inwardly along the radial direction of the hand body 14.

A rotational driving force of the screw rod 54 is transmitted to a bevel gear 18 through threaded engagement between a bevel gear 60 coaxially fixed to the distal end of the screw rod 54 and the bevel gear 18 rotatably mounted on the hand body 14, thus rotating the bevel gear 18. Upon rotation of the bevel gear 18, bevel gears 56 and 58 meshed with the bevel gear 18 are rotated. As a result, screw rods 50 and 52 are rotated, and remaining slide blocks 62 and 64 are similarly moved in the radial direction.

Note that the drive amount of the driving motor 80, i.e., the moving amounts of the slide blocks 62, 64, and 66 are set so that the radius of the outer peripheral surface of the C ring 132 to be gripped in a natural state is reduced by the lower ends of the corresponding gripping segments 68, 70, and 72 to be smaller than a radius of the inner surface of the lens barrel 13. When the slide blocks 62, 64, and 66, i.e., the gripping segments 68, 70, and 72 are moved inwardly in the radial direction by the moving amounts set as described above, the C ring 132 is gripped by the gripping segments 68, 70, and 72 while its radius is reduced.

Figure 10B:
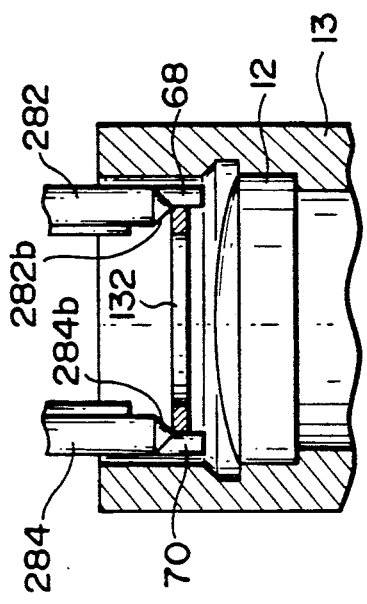
FIGS. 10A to 10D are sectional views sequentially showing a fitting operation of the C-ring in a lens barrel.
Figure 10D:
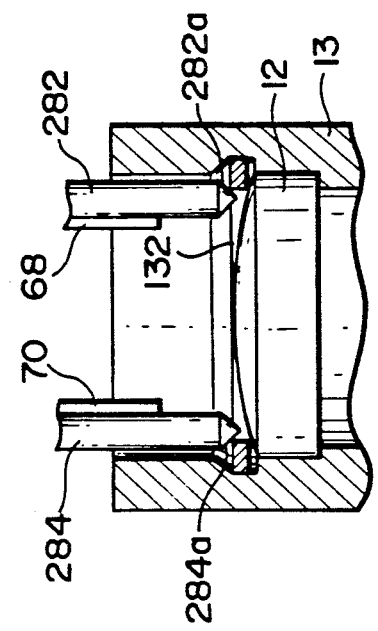
Figure 10A:
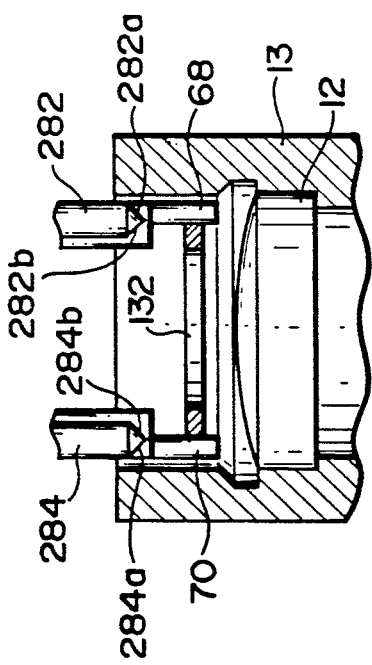

The robot hand 230 is moved vertically and horizontally while gripping the C ring 132 through the gripping segments 68, 70, and 72, so that the gripped C ring 132 is inserted in the lens barrel 13, as shown in FIG. 10A.

Thereafter, the compressed air source is started to supply compressed air into the cylinder bodies 298, 300, and 302 of the air cylinder mechanisms 292, 294, and 296. Upon supply of the compressed air, the pistons 304, 306, and 308 project from the corresponding cylinder bodies 298, 300, and 302, and the pressing members 282, 284, and 286 connected thereto are pressed downward. Upon pressing operation of the pressing members 282, 284, and 286, as shown in FIG. 10B, their lower ends are brought into contact with the upper surface of the C ring 132 gripped by the gripping segments 68, 70, and 72 from above, thereby pressing the C ring 132 downward.

Figure 10C:
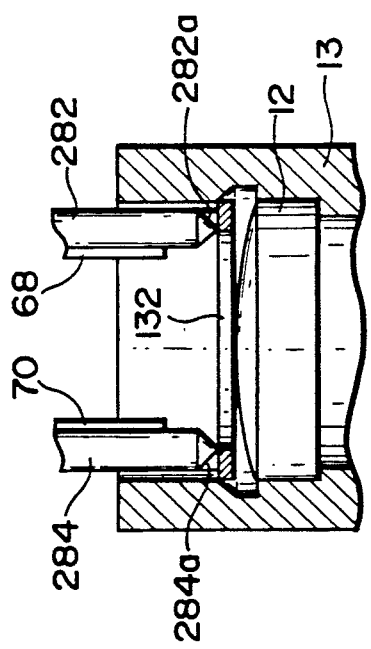

In this manner, the C ring 132 is pushed out downward from the gripping segments 68, 70, and 72 and is expanded to recover its radius, as shown in FIG. 10C. As a result, the C ring 132 is released from the gripping state, and is expanded in the lens barrel 13. Thus, the C ring 132 is fitted in the fitting groove 310 formed in the inner surface of the lens barrel 13.

When the lower ends of the gripping segments 68, 70, and 72 are sufficiently inserted in the lens barrel 13, in other words, when they are inserted in the lens barrel 13 to positions immediately above the optical lens 12 mounted in advance, the C ring 132 is satisfactorily fitted in the fitting groove 310 located immediately above the optical lens 12 upon pressing operation of the pressing members 282, 284, and 286. However, if insertion of these gripping segments 68, 70, and 72 is insufficient, the C ring 132 is expanded on an inner surface portion above the fitting groove. In this state, the C ring 132 cannot be fitted in the fitting groove 310.

In order to prevent such a situation, in the third embodiment, the air cylinder mechanisms 292, 294, and 296 continue to press the pressing members 282, 284, and 286 downward after the state shown in FIG. 10C is attained. For this reason, the C ring 132, which is released from the gripping state by the gripping segments 68, 70, and 72, is further pressed downward while being biased outwardly by the inclined surfaces 282a, 284a, and 286a formed on the lower surfaces of the pressing members 282, 284, and 286.

In this embodiment, the C ring 132 is forcibly pressed into the fitting groove 310, as shown in FIG. 10D, in other words, the C ring 132 can be reliably fitted in the fitting groove 310. Thereafter, the robot hand 230 is removed upward from the lens barrel 13 upon upward movement of the robot arm, and is brought to its standby position. A series of fitting operations of the C ring 132 into the lens barrel 13 by the robot hand 230 are completed.

As has been described above, in the robot hand 230 of the third embodiment, when the C ring 132 is fitted in the lens barrel 13, the C ring 132 is conveyed into the lens barrel 13 while maintaining the gripping state of the C ring 132 by the gripping segments 68, 70, and 72. Therefore, the conveying/insertion operation can be reliably performed. The pressing members 282, 284, and 286 are pressed downward through the air cylinder mechanisms 292, 294, and 296 while maintaining the insertion state, thus fitting the C ring 132 into the fitting groove 310.

In this manner, according to the third embodiment, the C ring 132 can be reliably inserted and supported in the lens barrel 13 with a simple arrangement and good operability without preparing a plurality of hand bodies.

The arrangement of the third embodiment is not limited to the above-mentioned arrangement, and various changes and modifications may be made within the spirit and scope of the invention.

In the third embodiment, an article to be inserted is the C ring 132. However, the present invention is not limited to this. For example, the present invention can be applied to any article which is a substantially arcuated article having elasticity in a direction to increase/decrease its radius, and has a larger outer diameter than an inner diameter of a cylinder body in a natural state.

In the third embodiment, three gripping members are arranged, as indicated by reference numerals 68, 70, and 72. However, the present invention is not limited to this. The number of the gripping members need only be two or more.

In the third embodiment, each of the inclined surfaces formed on the lower ends of the pressing members 282, 284, and 286 is constituted by a pair of inclined surfaces which intersect each other at an acute angle to be symmetrical about the central axis of the corresponding one of the pressing members 282, 284, and 286. However, the present invention is not limited to this arrangement. Portions abutting against the upper surface of the C ring 132 may have inclined surfaces for deviating the engaged C ring 132 radially outwardly.

The inclined surfaces may be formed, as shown in first to third modifications in FIGS. 11A to 11C. More specifically, the inclined surfaces 282a; 282b, 284a; 284b, and 286a; 286b need not be formed to be symmetrical about the central axes of the corresponding pressing members 282, 284, and 286, as shown in the first modification in FIG. 11A.

As shown in the second modification in FIG. 11B, the inner surface in the radial direction need not be an inclined surface but may be a horizontal surface 282b (284b or 286b).

As shown in the third modification in FIG. 11C, only an inclined surface 282a (284b or 286b) which is inclined to deviate the C ring 132 engaged therewith radially outwardly may be formed without forming an inner surface in the radial direction.

As many apparently widely different embodiments of the present invention can be made without departing from the spirit and scope thereof, it is to be understood that the invention is not limited to the specific embodiments thereof except as defined in the appended claims.

What is claimed is:

1. An article gripping apparatus for gripping an article having a functional surface formed by an optical curved surface and a non-functional surface positioned around an outer periphery of the functional surface, comprising:

holding means including a plurality of holding members for contacting the non-functional surface of the article, each of said holding members having an outer peripheral surface which is set inwardly form an outer periphery of the non-functional surface of the article and an inner peripheral surface which is set outwardly from an inner periphery of the non-functional surface;

suction means for imparting a suction force to the article, said suction means being movable between a first position adjacent to the functional surface and a second position remote from the functional surface of the article, said suction means including a suction force generation source for generating the suction force, a suction pipe through which the suction force is applied to the functional surface at the first position, and first drive means for moving said suction pipe between the first position and the second position independent from said holding means, wherein said holding members contact the article on the same side as the suction force is applied from said suction pipe;

second drive means for moving said holding members between a contact position contacting the non-functional surface of the article and a separated position being separated from the non-functional surface of the article; and centering means having a plurality of centering members for adjusting the article to a predetermined position.

2. The apparatus according to claim 1, wherein said holding members and said centering members are arranged in pairs on a substantially concentrical circle about said suction member, with each said pair comprising a holding member and a centering member.

3. An article gripping apparatus according to claim 1, wherein said holding members are adjustable so as to be able to contact non-functional surfaces of different types of articles having different diameters.

4. An article gripping apparatus for selectively gripping a first article having a functional surface and a non-functional surface and a second article which is elastically deformable, comprising:

first holding means including a plurality of first holding members for contacting the non-functional surface of the first article;

suction means for imparting a suction force to the first article, said suction means being movable between a first position adjacent to the functional surface and a second position remote from the functional surface of the article, said suction means including a suction force generation source for generating the suction force, and a suction pipe through which the suction force is applied to the functional surface at the first position, and first drive means for moving said suction pipe between the first position and the second position independent from said holding means;

second holding means for holding the second article, said second holding means comprising a plurality of second holding members for pressing and elastically deforming an outer peripheral edge of the second article; and first drive means for moving said second holding means between a pressing position for pressing the outer peripheral edge of the second article and a non-pressing position not pressing the second article.

5. The apparatus according to claim 4, further comprising detaching means for detaching the second article held by said second holding means therefrom.

6. The apparatus according to claim 5, wherein said detaching means includes slide members, slidably arranged on said second holding members, for pushing out the second article; and second drive means for moving said slide members between a push-out position where the second article is pushed out from said second holding members and a non-push-out position allowing a state where the second article is held by said second holding members.

7. An article gripping apparatus for selectively gripping a first article having a functional surface and a non-functional surface, and an elastically deformable second article, comprising:

first gripping means for gripping the first article, said first gripping means including a plurality of contact members contacting the non-functional surface of the first article and a suction member for chucking the first article while maintaining a non-contact state with the functional surface of the first article;

second gripping means for gripping the second article, said second gripping means including gripper members for gripping the second article and moving means for moving the gripper members to change a position of the second article gripped by the gripper members; and placing means for placing the second article gripped by said second gripping means, wherein the first article chucked and gripped by said first gripping means is engaged with the second article gripped by said second gripping means.

8. An article gripping apparatus for gripping an article having a functional surface portion and a non-functional surface portion, comprising:

a hand body movable vertically and laterally;

holding means having a plurality of holding members, cooperating with said hand body, for contacting an upper-side of the non-functional surface portion of the article to be transferred;

a suction member, attached to said hand body and movable in the vertical direction, for imparting a suction force to the article, said suction member moving downward during a descending operation to a predetermined distance above a substantially central portion of the article, wherein said holding members are contacting the non-functional upper-side surface portion of the article;

drive means for vertically moving the suction member;

suction means, connected to said suction member, for creating the suction force by producing a negative pressure; and pressure detecting means for detecting the negative pressure produced in said suction means, wherein the descending operation of said suction member is controlled by said drive means and suspended when the negative pressure detected by said pressure detecting means reaches a predetermined value such that the suction force is strong enough to hold the article.

9. The apparatus according to claim 8, wherein the predetermined value of the negative pressure strong enough to hold the article is set at substantially 80% of the maximum negative pressure produced by said suction means.

10. An assembling method for securely positioning an optical element having a functional surface and a non-functional surface in a lens barrel using a ring member, comprising the steps of:

placing the optical element into the lens barrel by imparting a suction force to the functional surface of the optical element while holding the non-functional surface of the optical element;

placing the ring member into the lens barrel by contacting the outer periphery of the ring member and moving it into position within the lens barrel; and securing the optical element in the lens barrel by releasing the contraction of the ring member after the optical element is disposed at a prescribed position in the lens barrel.

11. The assembling method according to claim 10, further comprising the step of centering the optical element while holding the non-functional surface in the first step.

* * * * *

UNITED STATES PATENT AND TRADEMARK OFFICE
CERTIFICATE OF CORRECTION

PATENT NO. : 5,127,692

DATED : July 7, 1992

INVENTOR(S) : Takeshi Yakou, et al.

It is certified that error appears in the above-identified patent and that said Letters Patent is hereby corrected as shown below:

COLUMN 1:

Line 36, "article" should read --article.--.

COLUMN 17:

Line 39, "form" should read --from--.

Signed and Sealed this

Twenty-eighth Day of September, 1993

Attest:

BRUCE LEHMAN

Attesting Officer

Commissioner of Patents and Trademarks